United States Patent
Miyashita et al.

(10) Patent No.: US 9,812,734 B2
(45) Date of Patent: Nov. 7, 2017

(54) SULFIDE-BASED SOLID ELECTROLYTE FOR LITHIUM ION BATTERY

(71) Applicant: Mitsui Mining & Smelting Co., Ltd., Tokyo (JP)

(72) Inventors: Norihiko Miyashita, Ageo (JP); Takashi Chikumoto, Ageo (JP); Hideaki Matsushima, Ageo (JP); Kenji Matsuzaki, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/906,706

(22) PCT Filed: Jun. 23, 2014

(86) PCT No.: PCT/JP2014/066537
§ 371 (c)(1),
(2) Date: Jan. 21, 2016

(87) PCT Pub. No.: WO2015/012042
PCT Pub. Date: Jan. 29, 2015

(65) Prior Publication Data
US 2016/0156064 A1  Jun. 2, 2016

(30) Foreign Application Priority Data

Jul. 25, 2013 (JP) .................................. 2013-154243
Feb. 19, 2014 (WO) .................. PCT/JP2014/053873

(51) Int. Cl.
*H01M 10/05* (2010.01)
*H01M 10/0562* (2010.01)
(Continued)

(52) U.S. Cl.
CPC ......... *H01M 10/0562* (2013.01); *C01B 25/14* (2013.01); *H01M 4/587* (2013.01);
(Continued)

(58) Field of Classification Search
CPC ......... H01M 10/0525; H01M 10/0562; H01M 2300/0068; H01M 2220/20;
(Continued)

(56) References Cited

U.S. PATENT DOCUMENTS 7,052,803 B2   5/2006   Kato et al.
7,906,240 B2   3/2011   Ishii et al.
(Continued)

FOREIGN PATENT DOCUMENTS

CN   1481041 A   3/2004
CN   1906780 A   1/2007
(Continued)

OTHER PUBLICATIONS

Hans-Jorg Deiseroth et al., "Li6PS5X: A Class of Crystalline Li-Rich Solids With an Unusually High Li+ Mobility", Angewandte Chemie International Edition, Jan. 11, 2008, vol. 47/Issue 4, pp. 755-758.
(Continued)

*Primary Examiner* — Mark F Huff
*Assistant Examiner* — Monique Wills
(74) *Attorney, Agent, or Firm* — The Webb Law Firm

(57) ABSTRACT

Provided is a solid electrolyte with which charge/discharge efficiency and cycle characteristics can be increased by reducing the electron conductivity of a compound which has a cubic crystal structure belonging to a space group F-43m, and is represented by Compositional Formula: $Li_{7-x}PS_{6-x}Ha_x$ (Ha is Cl or Br). Proposed is a sulfide-based solid electrolyte for a lithium ion battery, which includes a compound having a cubic crystal structure belonging to a space group F-43m, and being represented by Compositional Formula: $Li_{7-x}PS_{6-x}Ha_x$ (Ha is Cl or Br), in which x in the above Compositional Formula is 0.2 to 1.8, and the value of the lightness L* thereof in the L*a*b* color system is 60.0 or more.

20 Claims, 9 Drawing Sheets

(51) Int. Cl.
*H01M 10/0525* (2010.01)
*C01B 25/14* (2006.01)
*H01M 4/587* (2010.01)

(52) U.S. Cl.
CPC .... *H01M 10/0525* (2013.01); *H01M 2220/20* (2013.01); *H01M 2220/30* (2013.01); *H01M 2300/008* (2013.01); *H01M 2300/0068* (2013.01); *Y02T 10/7011* (2013.01)

(58) Field of Classification Search
CPC ....... H01M 2220/30; H01M 2300/008; H01M 4/587; C01B 25/14; Y02T 10/7011
See application file for complete search history.

(56) References Cited

U.S. PATENT DOCUMENTS

| | | |
|---|---|---|
| 2010/0290969 A1 | 11/2010 | Deiseroth et al. |
| 2011/0081580 A1* | 4/2011 | Stadler .................. H01M 4/131 429/319 |
| 2013/0065138 A1* | 3/2013 | Takahata ............... H01M 4/133 429/338 |
| 2013/0177821 A1 | 7/2013 | Tsuchida et al. |

FOREIGN PATENT DOCUMENTS

| | | |
|---|---|---|
| JP | 3184517 A | 4/2001 |
| JP | 2001250580 A | 9/2001 |
| JP | 3744665 A | 12/2005 |
| JP | 2007-317551 A | 12/2007 |
| JP | 2010540396 A | 12/2010 |
| JP | 201196630 A | 4/2011 |
| JP | 2012-48971 A | 3/2012 |

OTHER PUBLICATIONS

Hans-Jorg Deiseroth et al., "Li7PS6 and Li6PS5X (X:Cl, Br, I): Possible Three-dimensional Diffusion Pathways for Lithium Ions and Temperature Dependence of the Ionic Conductivity by Impedence Measurements", Journal of Inorganic and General Chemistry, Aug. 2011, vol. 637/Issue 10, pp. 1287-1294.

Sylvain Boulineau et al., "Mechanochemical synthesis of Liargyrodite Li6PS5X (X=Cl, Br, I) as sulfur-based solid electrolytes for all solid state batteries application", Solid State Ionics, Aug. 3, 2012, vol. 221/Issue 3, pp. 1-5.

R.Prasada Rao et al., "Formation and conductivity studies of lithium argyrodite solid electrolytes using insitu neutron diffraction", Solid State Ionics, Jan. 10, 2013, vol. 230/Issue 10, pp. 72-76.

* cited by examiner

SULFIDE-BASED SOLID ELECTROLYTE FOR LITHIUM ION BATTERY

CROSS-REFERENCE TO RELATED APPLICATIONS

This application is the United States national phase of International Application No. PCT/JP2014/066537 filed Jun. 23, 2014, and claims priority to Japanese Patent Application No. 2013-154243 filed Jul. 25, 2013 and International Application No. PCT/JP2014/053873 filed Feb. 19, 2014, the disclosures of which are hereby incorporated in their entirety by reference.

TECHNICAL FIELD

The present invention relates to a sulfide-based solid electrolyte for a lithium ion battery, which can be suitably used as a solid electrolyte for a lithium ion battery.

BACKGROUND ART

A lithium ion battery is a secondary battery having a structure, in which, at the time of charging, lithium begins to dissolve as ions from a positive electrode and moves to a negative electrode to be stored therein, while, at the time of discharging, on the contrary, the lithium ions return from the negative electrode to the positive electrode. Since the lithium ion battery has high energy density, and a long life cycle, it is widely used as a power supply for home appliances such as a video camera, portable electronic equipment such as a notebook computer and a portable telephone, and electrically-drive tools such as a power tool. Recently, the lithium ion battery is also applied to a large-sized battery that is mounted in an electric vehicle (EV), a hybrid electric vehicle (HEV), or the like.

This kind of a lithium ion battery is constituted of a positive electrode, a negative electrode, and an ion conducting layer inserted between both of the electrodes. As the relevant ion conducting layer, a separator constituted of a porous film, such as polyethylene and polypropylene, which is filled with a non-aqueous electrolytic solution, is generally used. However, since such an organic electrolytic solution using a flammable organic solvent as a solvent is used as an electrolyte, it is required to improve the structure and material for preventing volatilization or leakage, and also, it is required to install a safety device for suppressing an increase in temperature at the time of a short circuit and to improve the structure and material for preventing a short circuit.

In contrast, an all-solid lithium battery that is constituted by solidifying the whole battery using a solid electrolyte using lithium sulfide ($Li_2S$) as a starting material does not use a flammable organic solvent, and thus, it is possible to attempt the simplification of a safety device. In addition, the battery can be made excellent in the production cost and productivity. Furthermore, it is possible to attempt high voltage by laminating it in a cell in series. Furthermore, for this kind of a solid electrolyte, a Li ion only moves, and thus, there are no side reactions by the movement of anion. Therefore, it is expected that it leads to improve safety or durability.

Such a solid electrolyte that is used for a battery has high ionic conductivity and should be chemically or electrochemically stable, and for example, lithium halide, lithium nitride, lithium oxoate, or derivatives thereof are known as the candidate of raw material.

With regard to this kind of a solid electrolyte, for example, Patent Document JP 3184517 B1 discloses a sulfide-based solid electrolyte, in which a high temperature lithium ion conductive compound composed of lithium phosphate ($Li_3PO_4$) allows to be in lithium ion conductive sulfide glass represented by General Formula, $Li_2S$-X (wherein X represents at least one sulfide of $SiS_2$, $GeS_2$, and $B_2S_3$).

In addition, Patent Document JP 3744665 B1 discloses a sulfide-based solid electrolyte including a lithium ion conductive material that is a composite compound represented by General Formula, $Li_2S$—$GeS_2$—X (wherein X represents at least one type of $Ga_2S_3$ and ZnS) as a material that is crystalline and exhibits very high ionic conductivity, that is, $6.49 \times 10^{-5}$ S·cm$^{-1}$ of the ionic conductivity at room temperature.

Patent Document JP 2001-250580 A discloses lithium ion conductive sulfide ceramics that are sulfide ceramics having high lithium ionic conductivity and decomposition voltage, which have $Li_2S$ and $P_2S_5$ as a main component, and the composition of $Li_2S$=82.5 to 92.5 and $P_2S_5$=7.5 to 17.5 by mol %, and among them, preferably the composition of $Li_2S/P_2S_5$=7 (Compositional Formula: $Li_7PS_6$) in a mole ratio.

Patent Document JP 2011-96630 A discloses a lithium ion conductive material that is represented by Chemical Formula: $Li^+_{(12-n-x)}B^{n+}X^{2-}_{(6-x)}Y^-_x$ ($B^{n+}$ is at least one type selected from P, As, Ge, Ga, Sb, Si, Sn, Al, In, Ti, V, Nb, and Ta, $X^{2-}$ is at least one type selected from S, Se, and Te, $Y^-$ is at least one type selected from F, Cl, Br, I, CN, OCN, SCN, and $N_3$, and $0 \le x \le 2$), and has an argyrodite-type crystal structure.

Patent Document JP 2010-540396 A discloses a lithium argyrodite, which is a solid compound capable of being prepared as a single layer in addition to high fluidity of the lithium ion, and is represented by General Formula (I) $Li^+_{(12-n-x)}B^{n+}X^{2-}_{6-x}Y^-_x$, in which in Formula, $B^{n+}$ is selected from the group consisting of P, As, Ge, Ga, Sb, Si, Sn, Al, In, Ti, V, Nb, and Ta, $X^{2-}$ is selected from the group consisting of S, Se, and Te, $Y^-$ is selected from the group consisting of Cl, Br, I, F, CN, OCN, SCN, and $N_3$, and $0 \le x \le 2$.

The present inventor focused on a compound having a cubic crystal structure belonging to a space group F-43m and being represented by Compositional Formula: $Li_{7-x}PS_{6-x}Ha_x$ (Ha is Cl or Br), as a solid electrolyte material used for a lithium ion battery.

However, when such a compound is used as a solid electrolyte for a lithium ion battery, there are problems in that electron conductivity is high, and charge/discharge efficiency and cycle characteristic are not increased as predicated.

Therefore, an object of the invention is to provide a novel sulfide-based solid electrolyte for a lithium ion battery, in which for a compound having a cubic crystal structure for a space group F-43m, and being represented by Compositional Formula: $Li_{7-x}PS_{6-x}Ha_x$ (Ha is Cl or Br), the charge/discharge efficiency and cycle characteristics thereof can be increased by reducing the electron conductivity through increasing the lithium ion conductivity for the compound.

SUMMARY OF THE INVENTION

The invention proposes a sulfide-based solid electrolyte for a lithium ion battery, which includes a compound having a cubic crystal structure belonging to a space group F-43m, and being represented by Compositional Formula: $Li_{7-x}PS_{6-x}Ha_x$ (Ha is Cl or Br), in which x in the aforementioned Compositional Formula is 0.2 to 1.8, and a value of the lightness L* thereof in the L*a*b* color system is 60.0 or more.

In addition, the invention proposes a method for producing such a sulfide-based solid electrolyte for a lithium ion battery, in which the method includes mixing a lithium sulfide ($Li_2S$) powder, a phosphorus sulfide ($P_2S_5$) powder, and a lithium chloride (LiCl) powder or a lithium bromide (LiBr) powder, and firing the mixture thus obtained at 350 to 500° C. under an inert atmosphere or firing the mixture thus obtained at 350 to 650° C. under the atmosphere including a hydrogen sulfide gas.

For the sulfide-based solid electrolyte proposed by the invention, since there are a few of sulfur defects, and thus, crystallinity is high, the lithium ion conductivity is high, the electron conductivity is also low, and a transport number of lithium ion is high. Therefore, when it is used as a solid electrolyte for a lithium ion battery, it is possible to increase charge/discharge efficiency and cycle characteristics.

DETAILED DESCRIPTION OF THE INVENTION

Figure 1:
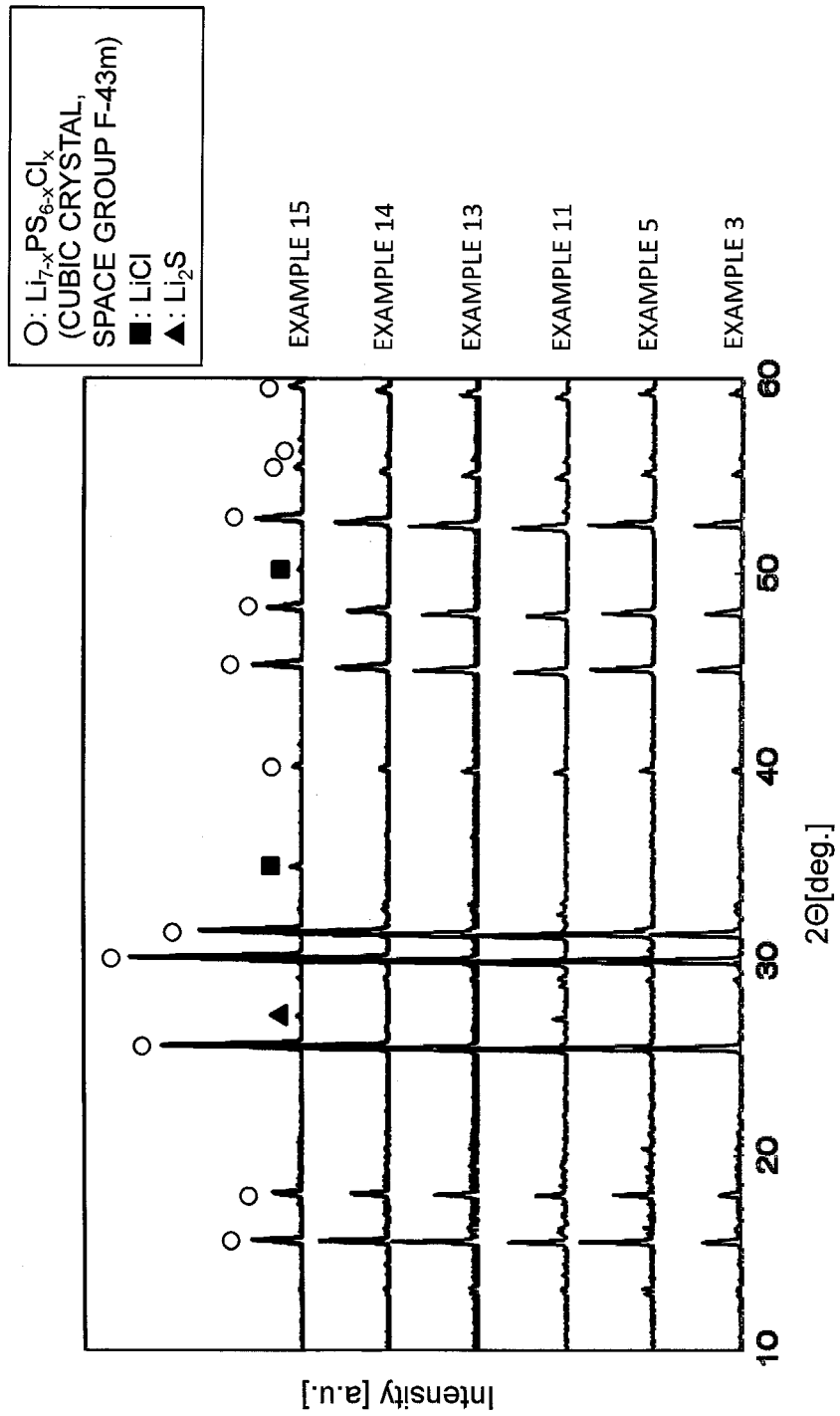
FIG. 1 is a drawing exhibiting the XRD patterns of the samples of Examples when Ha is Cl.
Figure 2:
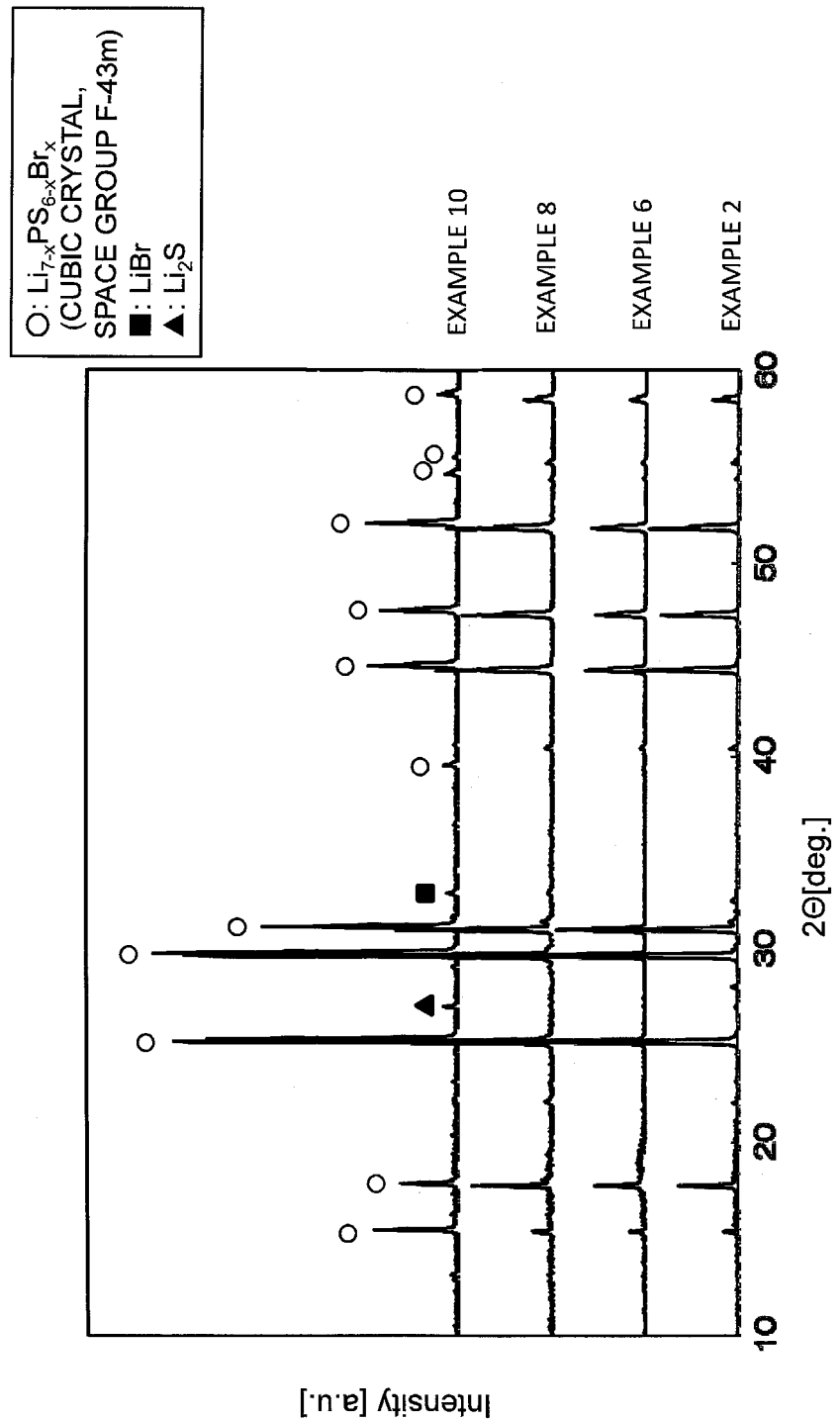
FIG. 2 is a drawing exhibiting the XRD pattern of the samples of Examples when Ha is Br.
Figure 3:
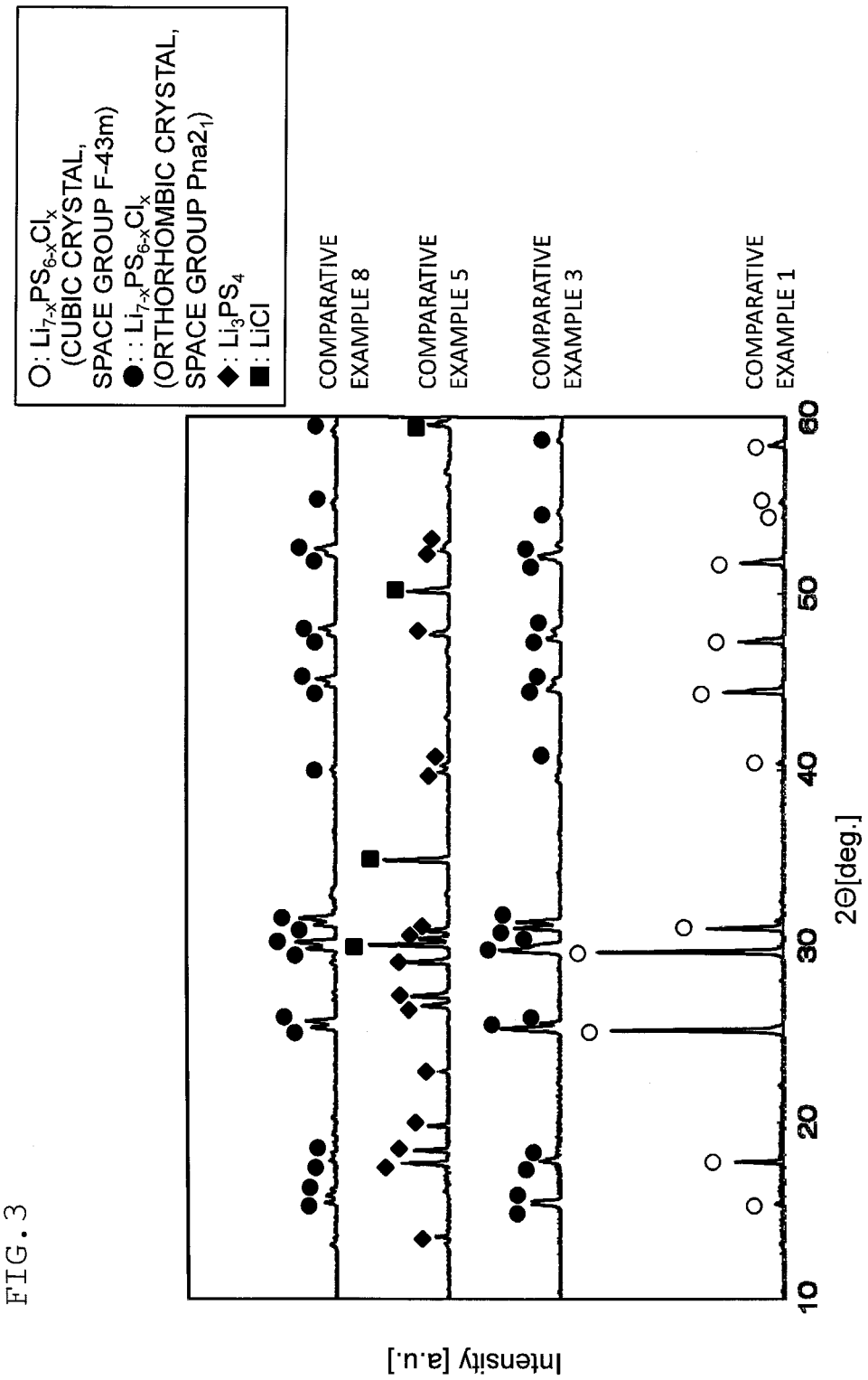
FIG. 3 is a drawing exhibiting the XRD patterns of the samples of Comparative Examples when Ha is Cl.
Figure 4:
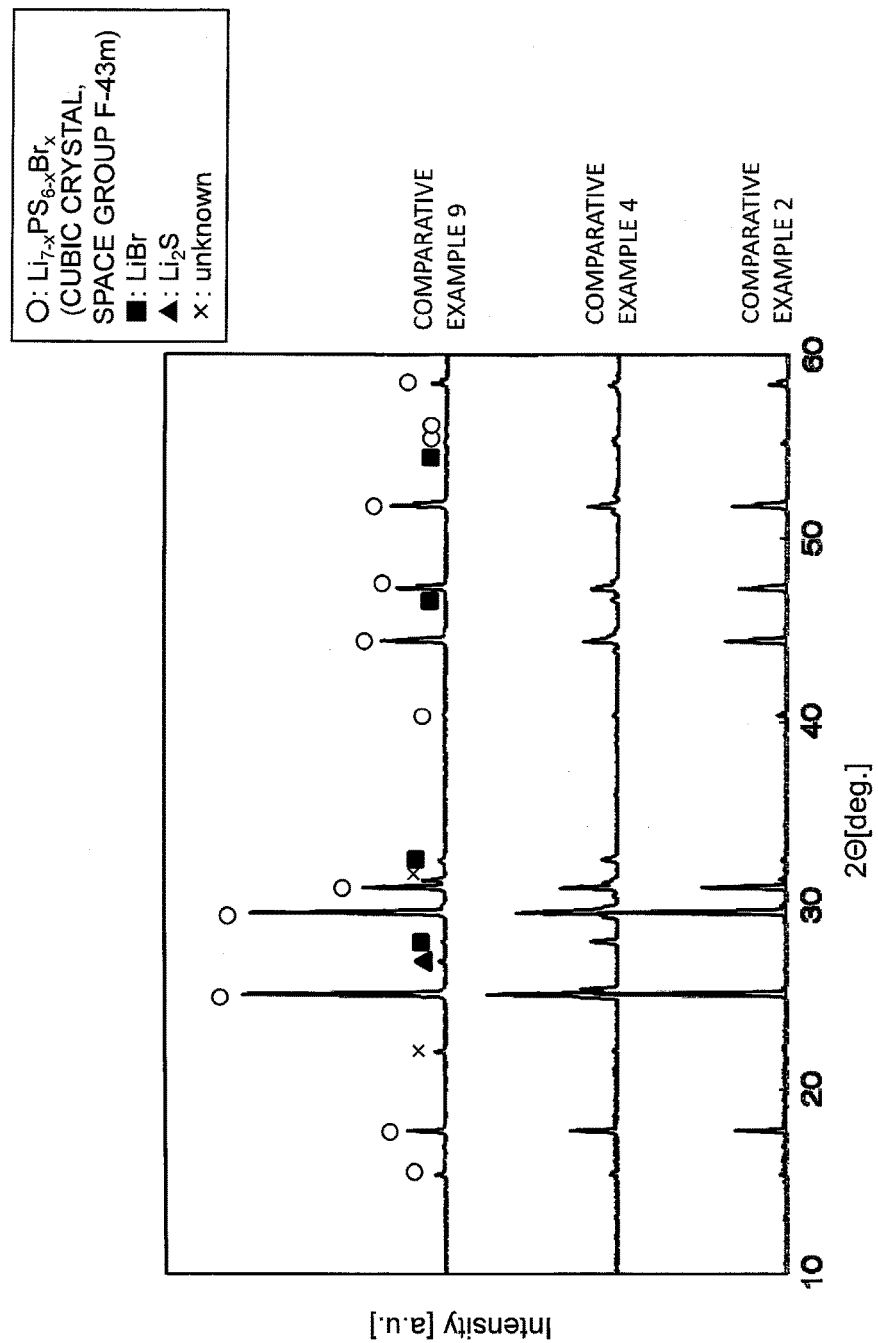
FIG. 4 is a drawing exhibiting the XRD patterns of the samples of Comparative Examples when Ha is Br.
Figure 5:
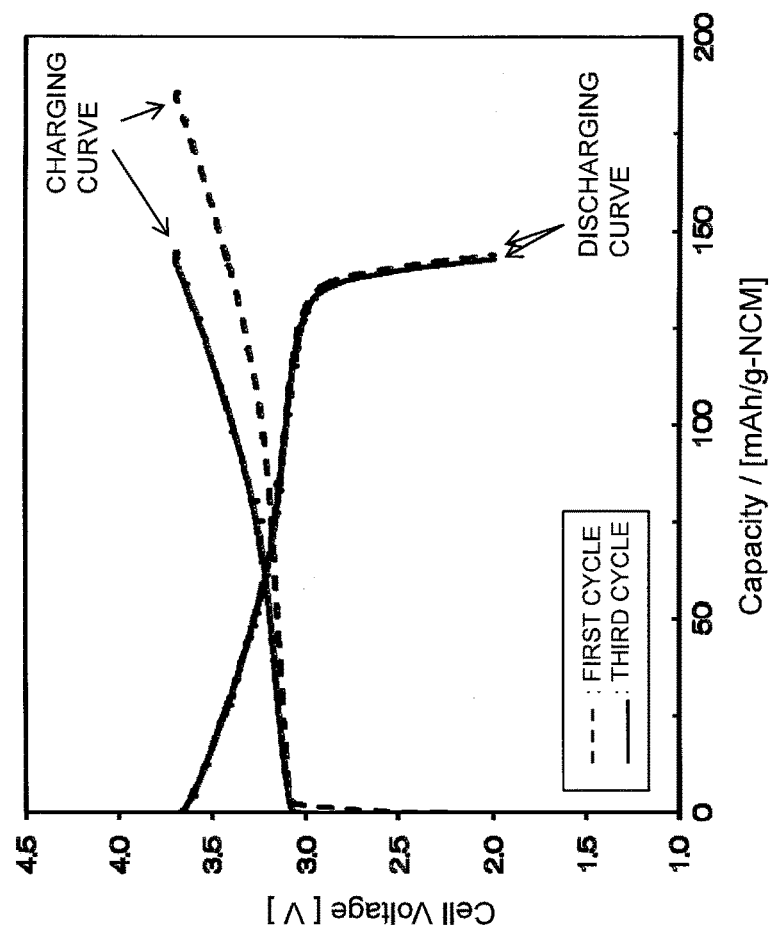
FIG. 5 is a drawing exhibiting the charge/discharge characteristics for the first and third cycles when an all-solid InLi/NCM cell is prepared using the sample obtained in Example 5 and then is evaluated.
Figure 6:
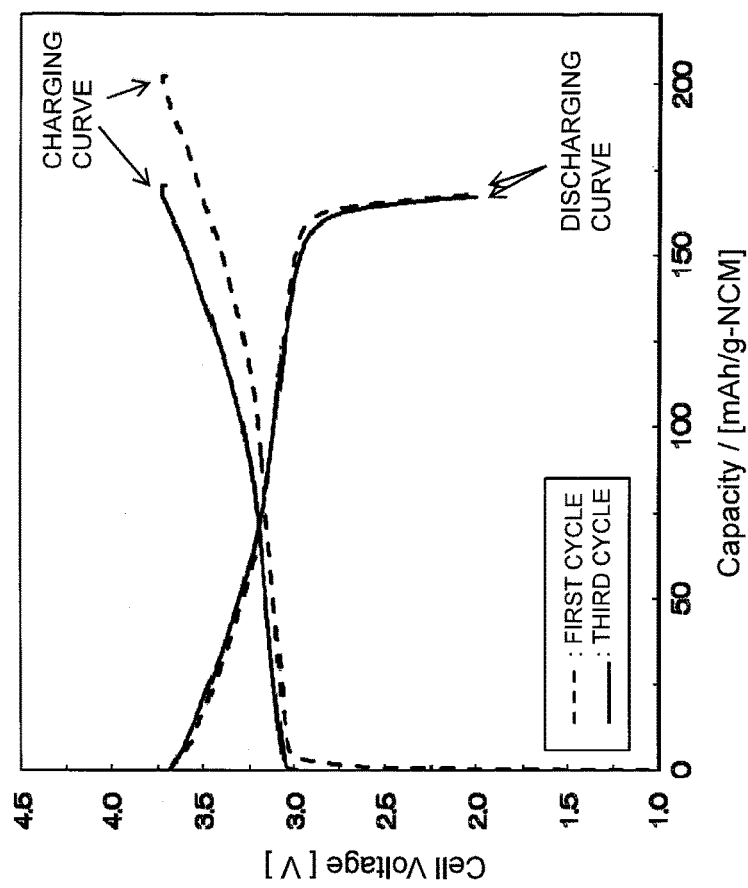
FIG. 6 is a drawing exhibiting the charge/discharge characteristics for the first and third cycles when an all-solid InLi/NCM cell is prepared using the sample obtained in Example 13 and then is evaluated.
Figure 7:
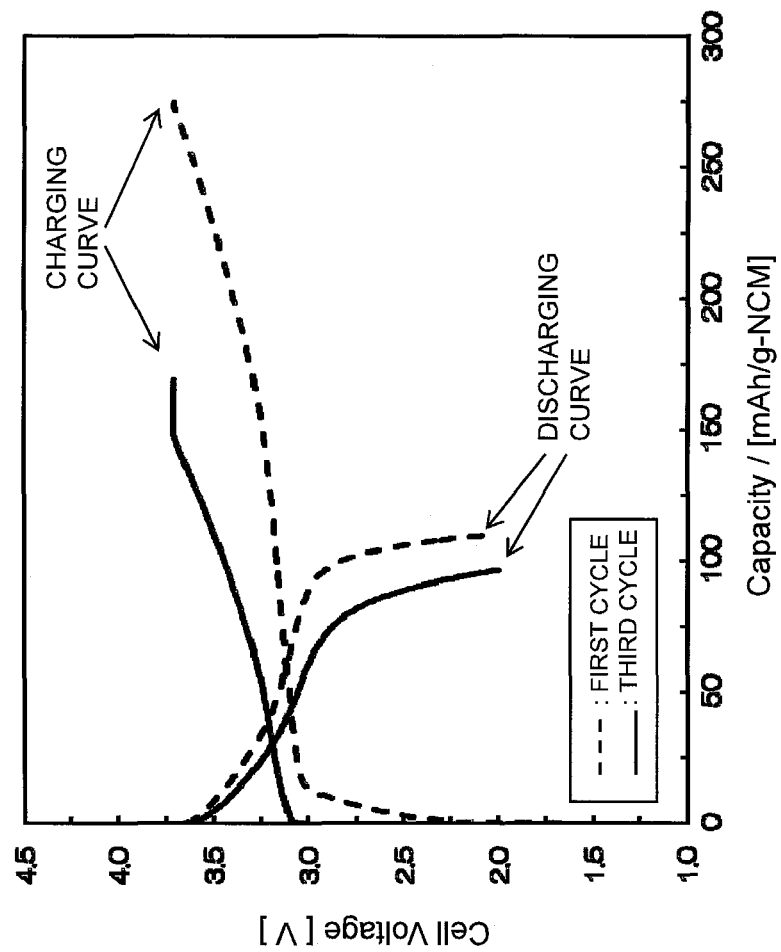
FIG. 7 is a drawing exhibiting the charge/discharge characteristics for the first and third cycles when an all-solid InLi/NCM cell is prepared using the sample obtained in Comparative Example 1 and then is evaluated.
Figure 8:
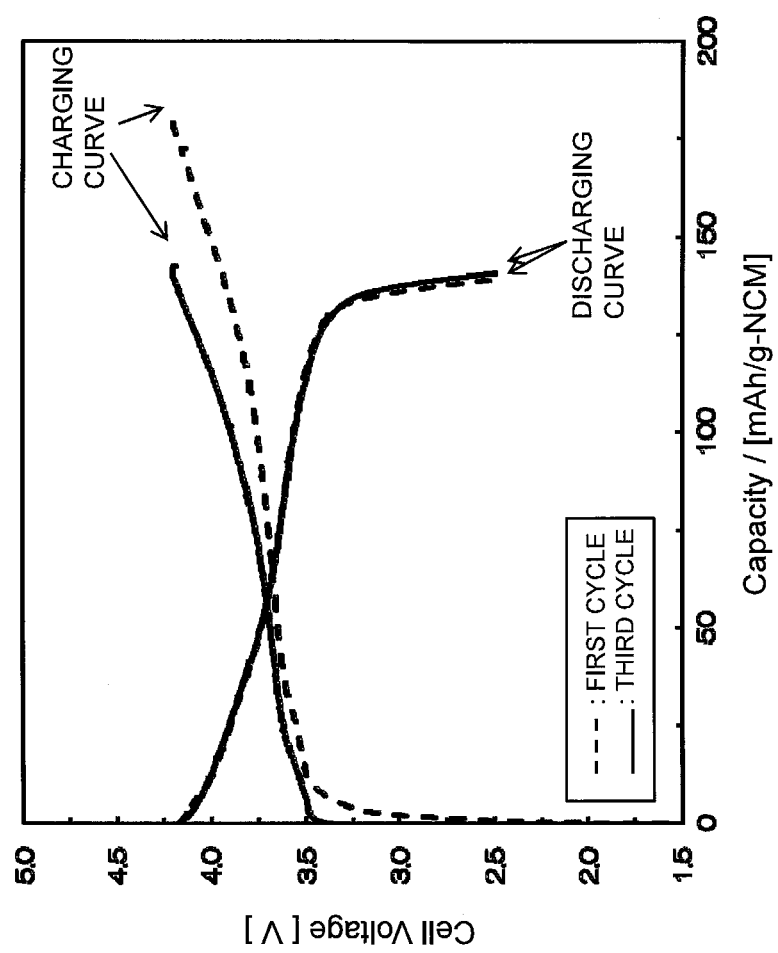
FIG. 8 is a drawing exhibiting the charge/discharge characteristics for the first and third cycles when an all-solid Gr/NCM cell is prepared using the sample obtained in Example 5 and then is evaluated.
Figure 9:
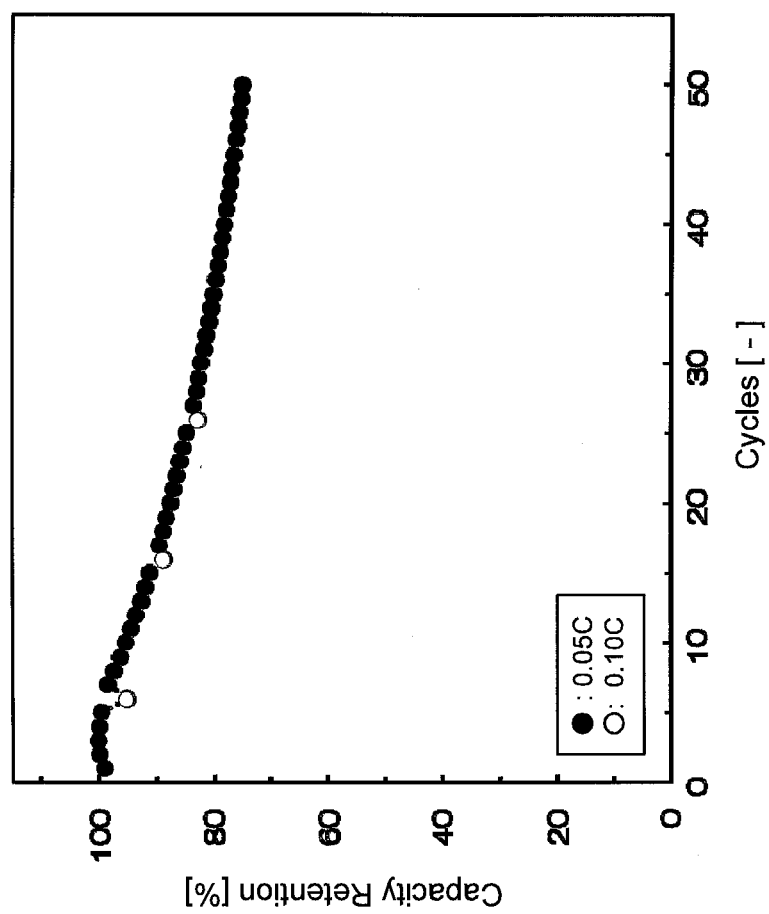
FIG. 9 is a drawing exhibiting the capacity retention rate when an all-solid Gr/NCM cell is prepared using the sample obtained in Example 5 and then is evaluated.

Hereinafter, the embodiments of the invention will be described in detail. However, the range of the invention is not limited to the embodiments described below.

The sulfide-based solid electrolyte (refers to as the "present solid electrolyte") according to the present embodiment includes a compound having a cubic crystal structure belonging to a space group F-43m, and being represented by Compositional Formula (1): $Li_{7-x}PS_{6-x}Ha_x$ (Ha is Cl or Br).

In the above Compositional Formula (1): $Li_{7-x}PS_{6-x}Ha_x$, x that represents the content of a Ha element is preferably 0.2 to 1.8. When x is 0.2 to 1.8, it is possible to have a cubic crystal structure belonging to a space group F-43m, and also, to suppress the production of impurity phase, and thereby, it is possible to increase the conductivity of lithium ion.

From such a viewpoint, x is preferably 0.2 to 1.8, and among them, more preferably x is 0.6 or more or 1.6 or less.

Among them, when Ha is Cl in the above Compositional Formula, x is preferably 0.2 to 1.8, and among them, x is preferably 0.4 or more, among them, x is 0.6 or more or 1.6 or less, and among them, more preferably 0.8 or more or 1.2 or less. In addition, when Ha is Cl, it has been considered heretofore that when Cl is less than 0.4, the orthorhombic crystal is mainly prepared. However, as the result of later test, it can be confirmed that, when Ha is Cl and x is included in the amount of 0.2 or more, the cubic crystal is prepared by further sufficiently performing the pulverizing and mixing in the step of mixing the raw materials.

Meanwhile, when Ha is Br, x is preferably 0.2 to 1.2, and among them, x is 0.4 or more or 1.2 or less, and among them, x is particularly preferably 0.6 or more or 1.2 or less.

It is known that the sulfide-based solid electrolyte has originally excellent ionic conductivity, easily forms the interface with an active material at room temperature as compared with oxide, and allows the interfacial resistance to decrease. Among them, for the present solid electrolyte, since there are a few of sulfur defects, and thus, the crystallinity is high, the electron conductivity is low and the lithium ionic conductivity is particularly excellent.

In addition, $Li_7PS_6$ having the same skeletal structure as $Li_{7-x}PS_{6-x}Ha_x$ has two crystal structures, that is, an orthorhombic crystal structure (space group $Pna2_1$) having low lithium ionic conductivity and a cubic crystal structure (space group F-43m) having high lithium ionic conductivity. Therefore, the phase transition point thereof is approximately around 170° C., and the crystal structure around room temperature is the orthorhombic crystal structure having low ionic conductivity. Accordingly, as described in Patent Document 3 described above, in general, it is necessary to perform the quenching processing after heating at the phase transition point or higher once in order to obtain the cubic crystal structure having high ionic conductivity. However, the compound having the above Compositional Formula does not have the phase transition point at room temperature or higher, and the crystal structure thereof can maintain the cubic crystal system having high ionic conductivity even at room temperature. Therefore, even if the treatment, for example, the quenching processing, is not performed, it is possible to secure high ionic conductivity, and thus, this point is particularly preferable.

It is preferable that the present solid electrolyte does not substantially include the phase constituted of lithium sulfide, lithium chloride, or lithium bromide. In the case of the single phase of $Li_{7-x}PS_{6-x}Ha_x$, the charge/discharge efficiency and cycle characteristics become good when a battery is assembled, and thus, it is more preferable.

Here, the expression "it does not substantially include the phase constituted of lithium sulfide, lithium chloride, or lithium bromide" means a case where the peak intensities of lithium sulfide, lithium chloride, and lithium bromide are less than 3% of the peak intensity of $Li_{7-x}PS_{6-x}Ha_x$ in an XRD chart.

(Transport Number of Lithium Ion)

In the present solid electrolyte, the transport number of lithium ion is preferably 90% or more, and among them, 95% or more and among them, more preferably, 99% or more.

When the transport number of lithium ion is 90% or more, the electron conductivity become low, and thus, it is possible to further increase the battery characteristics.

As a method for making the transport number of lithium ion of the present solid electrolyte to be 90% or more, for example, it is preferable that when Ha is Cl in the above Compositional Formula (1): x is adjusted to be 0.4 to 1.8 and when Ha is Br, x is adjusted to be 0.2 to 1.2; a lithium sulfide ($Li_2S$) powder, a phosphorus sulfide ($P_2S_5$) powder, and a lithium chloride (LiCl) powder or a lithium bromide (LiBr) powder are mixed by a ball mill, and the like, as described below; and then, the mixture thus obtained is fired at 350 to 500° C. under the inert atmosphere or is fired at 350 to 650° C. under the atmosphere including a hydrogen sulfide gas. However, the invention is not limited to this method.

(Lightness)

In the present solid electrolyte, the value of the lightness L* thereof in the L*a*b* color system is preferably 60.0 or more, and among them, 70.0 or more and among them, more preferably 75.0 or more. It is considered that this is because when there are many sulfur defects in the solid electrolyte, the sulfur loss absorbs a visible ray, and thus, the lightness becomes low. In addition, it is considered that when sulfur defects are generated in the solid electrolyte, an electron is generated by the following Formula (1), thereby exhibiting the electron conductivity.

$$Ss \rightarrow Vs^{\bullet\bullet} + 2e' + \tfrac{1}{2}S_2 \uparrow \qquad \text{Formula (1):}$$

Ss: Sulfur element existed in sulfur site in solid electrolyte
Vs••: Sulfur defect site in solid electrolyte
e': Produced electron
$S_2\uparrow$: Sulfur molecule fallen from solid electrolyte As a method for making the value of the lightness L* to be 60.0 or more by suppressing the production of sulfur loss in the present solid electrolyte, for example, it is preferable that when Ha is Cl in the above Compositional Formula (1): x is adjusted to be 0.4 to 1.8 and when Ha is Br, x is adjusted to be 0.2 to 1.2; a lithium sulfide ($Li_2S$) powder, a phosphorus sulfide ($P_2S_5$) powder, and a lithium chloride (LiCl) powder or a lithium bromide (LiBr) powder are mixed by a ball mill, and the like, as described below; and then, the mixture thus obtained is fired at 350 to 500° C. under the inert atmosphere or is fired at 350 to 650° C. under the atmosphere including a hydrogen sulfide gas. However, the invention is not limited to this method.

(Producing Method)

Next, an example of the method for producing the present solid electrolyte will be described. However, the producing method as described here is merely an example, and the invention is not limited to this method.

For the present solid electrolyte, for example, it is preferable that a lithium sulfide ($Li_2S$) powder, a phosphorus sulfide ($P_2S_5$) powder, and a lithium chloride (LiCl) powder or a lithium bromide (LiBr) powder are respectively weighed, and then, pulverized and mixed by a ball mill, a beads mill, a homogenizer, and the like.

At this time, for the pulverizing and mixing, when the crystallinity of raw material powders is reduced or subjected to an amorphizing process, or the mixed powder of raw materials is homogenized by a very strong mechanical pulverizing and mixing, for example, a mechanical alloying method, the chemical bond between cation and sulfur is broken to fall sulfur at the time of firing, thereby generating the sulfur defects and exhibiting electron conductivity. For this reason, the pulverizing and mixing in the level capable of maintaining the crystallinity of raw material powders is preferable.

After performing the mixing as described above, if necessary, the drying is performed, and then, the firing is performed under the inert atmosphere or a hydrogen sulfide gas ($H_2S$). Since then, it can be obtained by cracking or pulverizing, if necessary; and then, by classifying, if necessary.

In addition, when the temperature is increased, it is easy to generate the sulfur defects because the sulfur is fallen in the sulfide materials. Therefore, the sulfide materials are conventionally fired at a high temperature after sealing the sulfide materials with quartz ampoule, and the like. However, in this case, there is difficulty in industrial production. In addition, the sealed quartz ampoules are enclosed. Therefore, the gas included in the quartz ampoule is expanded by heating, and thus, the pressure in the quartz ampoules is increased, and thereby, it might be broken. Therefore, it is necessary to make a vacuum state at the time of sealing as much as possible. However, in the state of vacuum, the sulfur in the sulfide materials is fallen, and thus, it is easy to generate the sulfur defects.

In contrast, the crystallization of the present solid electrolyte proceeds at about 200°, and thus, even if the firing is performed at a relative low temperature, it is possible to synthesis. For this reason, it is possible to prepare the present solid electrolyte that is the sulfide that substantially includes a stoichiometry composition, in which there are almost no sulfur defects, by firing at 350° C. or higher under the inert atmosphere or a hydrogen sulfide gas ($H_2S$).

Among them, when using a hydrogen sulfide gas at the time of firing, the sulfur partial pressure near the firing sample can be increased due to the sulfur gas generated by decomposing hydrogen sulfide at the time of firing. Therefore, it is difficult to generate the sulfur defects even at the high firing temperature, and the electron conductivity can be decreased. Accordingly, when firing under the atmosphere including a hydrogen sulfide gas, the firing temperature is preferably 350 to 650° C., and among them, 450° C. or higher or 600° C. or lower, and among them, more preferably, 500° C. or higher or 550° C. or lower.

As described above, when firing under a hydrogen sulfide gas ($H_2S$), it is possible to fire it without sulfur defect in the sulfide by firing at 350 to 650° C.

Meanwhile, when firing under the inert atmosphere, unlike the case of the hydrogen sulfide gas, it is possible to increase the sulfur partial pressure near the firing sample at the time of firing. Therefore, in the case of high firing temperature, it is easy to generate sulfur defects and increase the electron conductivity. For this reason, when firing under the inert atmosphere, the firing temperature is preferably 350 to 500° C., and among them, 350° C. or higher or 450° C. or lower and among them, more preferably, 400° C. or higher or 450° C. or lower.

In addition, generally, the powder of raw materials is completely reacted so as to disappear the un-reacted phase. Therefore, it is preferable to fire at 500° C. or higher under a hydrogen sulfide gas, but in the case of using the powder of raw materials having small particle size and high reactivity, since the reaction is promoted even at a low temperature, the firing may be performed even under the inert atmosphere.

In addition, the raw material and fired product are very unstable in the atmosphere, and thus, are decomposed by reacting with water, generate a hydrogen sulfide gas or are oxidized. For this reason, it is preferable to perform a series of operations to set the raw materials in a furnace and to take out the fired product from the furnace through a glove box and the like substituted with an inert gas atmosphere.

It is possible to suppress the generation of sulfur defects by producing as described above, and thus, it is possible to reduce the electron conductivity. For this reason, when an all-solid lithium ion battery is prepared using the present solid electrolyte, it is possible to make the battery characteristics such as charge/discharge characteristic or cycle characteristics to be good.

In addition, the un-reacted hydrogen sulfide gas is a poisonous gas, and thus, it is preferable that an exhaust gas is completely fired with a burner, and the like, and then is neutralized with the sodium hydroxide solution and is treated with sodium sulfide.

<Use of Present Solid Electrolyte>

The present solid electrolyte can be used for a solid electrolyte layer of an all-solid lithium secondary battery or an all-solid lithium primary battery, the solid electrolyte mixed in a positive electrode or negative electrode material, or the like.

For example, an all-solid lithium secondary battery can be constituted by forming a positive electrode, a negative electrode, and a layer constituted of the solid electrolyte between the positive electrode and the negative electrode.

Here, the layer constituted of the solid electrolyte can be prepared, for example, by a method including dropping slurry prepared from a solid electrolyte, a binder, and a solvent on a substrate, and rubbing and cutting with a doctor blade, and the like; a method for cutting an air knife after slurry contacting; and a screen printing method. Alternatively, the layer can be prepared in such a manner that powders of the solid electrolyte are pressed by a press and the like to prepare pressed powders, and then, the pressured powders are suitably processed.

As a positive electrode material, the positive electrode material that is being used as a positive electrode active material for a lithium ion battery may be properly used.

As for a negative electrode material, the negative electrode material that is being used as a negative electrode active material for a lithium ion battery may be properly used. However, the present solid electrolyte is electrochemically stable, and thus, carbon-based materials such as artificial graphite, natural graphite, and a non-graphitizing carbon (hard carbon), which may be charged/discharged at a low electric potential (about 0.1 V vs $Li^+/Li$) that is equal to a lithium metal, may be used. For this reason, it is possible to greatly improve the energy density of an all-solid lithium secondary battery by using a carbon-based material as a negative electrode material. Therefore, for example, the lithium ion battery having the present solid electrode and a negative electrode active material including a carbon such as artificial graphite, natural graphite, and a non-graphitizing carbon (hard carbon) may be constituted.

(Explanation of Term)

The term "solid electrolyte" in the invention means all the materials, in which an ion in a solid state, for example, $Li^+$ can be moved.

In addition, when "X to Y" (X and Y are arbitrary numbers) is described in the invention, unless otherwise particularly described, in addition to the meaning of "X or more and Y or less", the meanings of "preferably more than X" and "preferably less than Y" are also included.

In addition, when "X or more" (X is an arbitrary number) or "Y or less" (Y is an arbitrary number) is described, they includes the meanings of "one that is more than X is preferable" and "one that is less than Y is preferable."

EXAMPLES

Herein, the invention will be described based on Examples. However, the invention is not limited to these Examples.

Example 1

To be Compositional Formula listed in Table 1, 2.14 g of a lithium sulfide ($Li_2S$) powder, 2.07 g of a phosphorous pentasulfide ($P_2S_5$) powder, and 0.79 g of a lithium chloride (LiCl) powder were respectively weighed, and then, pulverized and mixed for 15 hours with a ball mill to prepare a mixed powder. The mixed powder was filled in a container made of a carbon, and then, fired at 400° C. for 4 hours at the rate of rising and lowering of temperature of 200° C./h in a tubular electric furnace under a hydrogen sulfide gas ($H_2S$, purity of 100%) at 1.0 L/min. Since then, the sample was pulverized with a mortar, and sieved with a sieve having a mesh size of 53 μm to obtain a sample in a powder state.

At this time, all of the weighing, mixing, setting in the electric furnace, taking out from the electric furnace, pulverizing, and sieving were performed in a glove box that was substituted with an Ar gas (dew point of −60° C. or higher) that was completed dried.

The obtained sample (compound) in a powder state was analyzed with an X-ray diffraction method (XRD), and as a result, it was confirmed that the sample had a cubic crystal structure in a space group F-43m, and also, was the compound represented by Compositional Formula: $Li_6PS_5Cl$.

Example 2

To be Compositional Formula listed in Table 1, 1.84 g of a lithium sulfide ($Li_2S$) powder, 1.78 g of a phosphorous pentasulfide ($P_2S_5$) powder, and 1.39 g of a lithium bromide (LiBr) powder were respectively weighed, and then, pulverized and mixed for 15 hours with a ball mill to prepare a mixed powder. The mixed powder was filled in a container made of a carbon, and then, fired at 500° C. for 4 hours at the rate of rising and lowering of temperature of 200° C./h in a tubular electric furnace under a hydrogen sulfide gas ($H_2S$, purity of 100%) at 1.0 L/min. Since then, the sample was pulverized with a mortar, and sieved with a sieve having a mesh size of 53 μm to obtain a sample in a powder state.

At this time, all of the weighing, mixing, setting in the electric furnace, taking out from the electric furnace, pulverizing, and sieving were performed in a glove box that was substituted with an Ar gas (dew point of −60° C. or higher) that was completed dried.

The obtained sample (compound) in a powder state was analyzed with XRD, and as a result, it was confirmed that the sample had a cubic crystal structure in a space group F-43m, and also, was the compound represented by Compositional Formula: $Li_6PS_5Br$.

Examples 3 to 15

The samples were prepared in the same method as in Example 1, except that the combined amounts of respective raw materials were changed to be Compositional Formulas listed in Table 1, and also, the firing atmospheres and firing temperatures were to be the atmospheres and temperatures listed in Table 1.

The obtained samples (compounds) in a powder state were analyzed with XRD, and as a result, it was confirmed that the samples had the cubic crystal structures in a space group F-43m, and also, were respectively the compounds represented by Compositional Formulas listed in Table 1.

Comparative Examples 1 and 2

To be Compositional Formulas listed in Table 1, the respective raw materials were weighed, and pulverized and mixed with a ball mill for 15 hours to prepare the mixed powders. The mixed powders were subjected to a uniaxial pressing molding at the pressure of 200 MPa to prepare pellets. Since then, the pellets were charged in a quartz tube, in which one side of the tube was sealed.

In addition, the inner side of the quartz tube was coated with a carbon spray so as not to react with the samples. Since then, the quartz tube was vacuum-exhausted while rotating the quartz tube with a glass lathe, and then, the one part of the quartz tube that was not sealed was sealed by heating the tube with a burner to prepare sealed quartz tubes with the samples.

Since then, the sealed quartz tubes with the samples were put in an electric furnace (box furnace), and then, were fired at 550° C. for 6 days at the rate of rising and lowering of the temperature of 100° C./h. Since then, the samples were pulverized with a mortar, and sieved with a sieve having a mesh size of 53 μm to obtain samples in a powder state.

The obtained samples (compounds) in a powder state were analyzed with XRD, and as a result, it was confirmed that the samples were respectively the compounds represented by Compositional Formulas listed in Table 1.

Comparative Examples 3 to 9

The samples were prepared in the same method as in Example 1, except that the combined amounts of respective raw materials were changed to be Compositional Formulas listed in Table 1, and also, the firing atmospheres and firing temperatures were to be the atmospheres and temperatures listed in Table 1.

The obtained samples (compounds) in a powder state were analyzed, and as a result, it was confirmed that the samples were respectively the compounds represented by Compositional Formulas listed in Table 1.

Example 16

To be Compositional Formula (Ha: Cl, x=0.2) of Comparative Example 8 listed in Table 1, the combined amounts of the respective raw materials were changed, and also, were pulverized and mixed at the rotating speed of 100 rpm for 10 hours using a planetary ball mill capable of mixing uniformly by the rotation and orbital motion instead of the pulverizing and mixing for 15 hours using a ball mill. Other than this, the sample was prepared in the same method as in Comparative Example 8.

The obtained sample (compound) in a powder state was analyzed, and as a result, it was confirmed that the sample was the compound represented by Compositional Formula listed in Table 1.

<Measurement of Composition Ratio>

The composition ratios of the samples obtained in Examples and Comparative Examples were measured with an ICP emission spectrometry.

<Measurement of Transport Number of Lithium Ion>

The samples obtained in Examples and Comparative Examples were subjected to a uniaxial pressing molding at the pressure of 200 MPa in a glove box to prepare pellets with a diameter of 10 mm and a thickness of 2 to 5 mm. The lithium foils with an external diameter of 9 mm and a thickness of 0.6 mm were inserted into both top and bottom sides of the pellet, put in an Al laminate bag, and then, subjected to a CIP molding at the pressure of 200 to 250 MPa to prepare pellets, in which both top and bottom sides thereof were adhered with the lithium foil. Since then, the pellet was inserted in a small vise for about a day, and then, the DC polarization measurement and AC impedance measurement before and after the DC polarization measurement were performed with 0.5 V of applied voltage (ΔV). As a result, the obtained values were applied to the following Evans Formula to obtain the transport number of lithium ion ($t_{Li}^+$).

$$t_{Li}^+ = I_S(\Delta V - I_0 R_0)/I_0(\Delta V - I_S R_S)$$

$I_0$ and $I_S$: Current values in the initial and steady states for DC polarization measurement, $R_0$ and $R_S$: Charge transfer resistance values in the initial and steady states for AC impedance measurement.

<Measurement of Lightness L*>

For the samples obtained in Examples and Comparative Examples, the glass holders that were used for an XRD measurement were charged with the samples, and then, measured using a spectrophotometer (CM-2600d manufactured by Konica Minolta, INC.). In addition, a source of D65 light was used as a source of light.

<Measurement of Ionic Conductivity>

The samples obtained in Examples and Comparative Examples were subjected to a uniaxial pressing molding at the pressure of 200 MPa in a glove box to prepare pellets with a diameter of 10 mm and a thickness of 2 to 5 mm. A carbon paste as an electrode was applied on both top and bottom sides of the pellet, and then, heated at 180° C. for 30 minutes to prepare samples for measuring ionic conductivity. The ionic conductivity was measured with an AC impedance method at room temperature (25° C.)

TABLE 1

| Examples/Comparative Examples | No. | x | Compositional Formulas | Burning atmosphere | Burning conditions | Crystal structure (space group) of main production phase and other production phase | Transport number [%] | Lightness L* | Conductivity [×10⁻⁴ S/cm] |
|---|---|---|---|---|---|---|---|---|---|
| Example | 1 | 1.0 | Li$_6$PS$_5$Cl | H$_2$S | 400° C. × 4 h | Cubic crystal (F-43m) | 100 | 80.1 | 12.5 |
|  | 2 | 1.0 | Li$_6$PS$_5$Br | H$_2$S | 500° C. × 4 h | Cubic crystal (F-43m) | 99 | 70.9 | 7.3 |
|  | 3 | 1.0 | Li$_6$PS$_5$Cl | H$_2$S | 500° C. × 4 h | Cubic crystal (F-43m) | 99 | 71.3 | 15.6 |
|  | 4 | 1.0 | Li$_6$PS$_5$Br | H$_2$S | 650° C. × 4 h | Cubic crystal (F-43m) | 90 | 60.1 | 3.3 |
|  | 5 | 1.0 | Li$_6$PS$_5$Cl | H$_2$S | 600° C. × 4 h | Cubic crystal (F-43m) | 95 | 75.5 | 6.2 |
|  | 6 | 0.8 | Li$_{6.2}$PS$_{5.2}$Br$_{0.8}$ | H$_2$S | 550° C. × 4 h | Cubic crystal (F-43m) | 97 | 71.2 | 6.2 |
|  | 7 | 1.0 | Li$_6$PS$_5$Cl | Ar | 400° C. × 4 h | Cubic crystal (F-43m) | 99 | 79.9 | 11.8 |
|  | 8 | 1.0 | Li$_6$PS$_5$Br | Ar | 500° C. × 4 h | Cubic crystal (F-43m) | 94 | 60.1 | 11.5 |
|  | 9 | 1.0 | Li$_6$PS$_5$Cl | Ar | 500° C. × 4 h | Cubic crystal (F-43m) | 93 | 61.2 | 7.48 |
|  | 10 | 0.2 | Li$_{6.8}$PS$_{5.6}$Br$_{0.2}$ | H$_2$S | 600° C. × 4 h | Cubic crystal (F-43m) + LiBr (micro) + Li$_2$S (micro) | 96 | 75.8 | 1.6 |

TABLE 1-continued

| Examples/Comparative Examples | No. | x | Compositional Formulas | Burning atmosphere | Burning conditions | Crystal structure (space group) of main production phase and other production phase | Transport number [%] | Lightness L* | Conductivity [×10⁻⁴ S/cm] |
|---|---|---|---|---|---|---|---|---|---|
| | 11 | 0.4 | $Li_{6.6}PS_{5.6}Cl_{0.4}$ | $H_2S$ | 500° C. × 4 h | Cubic crystal (F-43m) + $Li_2S$ (micro) | 99 | 78.6 | 4.4 |
| | 12 | 1.2 | $Li_{5.8}PS_{4.8}Br_{1.2}$ | $H_2S$ | 600° C. × 4 h | Cubic crystal (F-43m) + LiBr (micro) | 93 | 70.0 | 2.1 |
| | 13 | 0.8 | $Li_{6.2}PS_{5.2}Cl_{0.8}$ | $H_2S$ | 500° C. × 4 h | Cubic crystal (F-43m) | 99 | 72.2 | 7.9 |
| | 14 | 1.2 | $Li_{5.8}PS_{4.8}Cl_{1.2}$ | $H_2S$ | 500° C. × 4 h | Cubic crystal (F-43m) + LiCl (micro) | 100 | 82.5 | 15.6 |
| | 15 | 1.6 | $Li_{5.4}PS_{4.4}Cl_{1.6}$ | $H_2S$ | 500° C. × 4 h | Cubic crystal (F-43m) + LiCl (micro) + $Li_2S$ (micro) | 92 | 64.9 | 26.9 |
| Comparative Example | 1 | 1.0 | $Li_6PS_5Cl$ | Tube being sealed | 550° C. × 6 days | Cubic crystal (F-43m) | 60 | 47.2 | 7.9 |
| | 2 | 1.0 | $Li_4PS_5Br$ | Tube being sealed | 550° C. × 6 days | Cubic crystal (F-43m) | 82 | 54.5 | 10.3 |
| | 3 | 0.0 | $Li_7PS_6$ | $H_2S$ | 600° C. × 4 h | Orthorhombic crystal ($Pna2_1$) | 88 | 59.8 | 0.07 |
| | 4 | 1.4 | $Li_{5.6}PS_{4.6}Br_{1.4}$ | $H_2S$ | 600° C. × 4 h | Cubic crystal (F-43m) + LiBr + unknown | Immeasurable | 51.7 | Immeasurable |
| | 5 | 2.0 | $Li_5PS_4Cl_2$ | $H_2S$ | 600° C. × 4 h | LiCl—$Li_3PS_4$ | Immeasurable | 70.6 | Immeasurable |
| | 6 | 1.0 | $Li_6PS_5Br$ | $H_2S$ | 700° C. × 4 h | Immeasurable (sample melting) | | | |
| | 7 | 1.0 | $Li_6PS_5Cl$ | $H_2S$ | 700° C. × 4 h | Immeasurable (sample melting) | | | |
| | 8 | 0.2 | $Li_{6.8}PS_{5.8}Cl_{0.2}$ | $H_2S$ | 600° C. × 4 h | Orthorhombic crystal ($Pna2_1$) | 85 | 61.3 | 0.9 |
| | 9 | 1.0 | $Li_6PS_5Br$ | Ar | 600° C. × 4 h | Cubic crystal (F-43m) + unknown + LiCl (micro) + $Li_2S$ (micro) | 79 | 45.7 | 3.9 |
| | 10 | 1.0 | $Li_4PS_5Cl$ | Ar | 600° C. × 4 h | Cubic crystal (F-43m) + LiCl | 82 | 44.2 | 5.3 |
| Example | 16 | 0.2 | $Li_{6.8}PS_{5.8}Cl_{0.2}$ | $H_2S$ | 600° C. × 4 h | Cubic crystal (F-43m) | 94 | 76.6 | 2.6 |

"x" in Table 1 represents x of $Li_{7-x}PS_{6-x}Ha_x$ (Ha is Cl or Br), and "transport number" represents a transport number of lithium ion ($t_{Li}^+$).

In addition, in Table 1, "LiCl (micro)", "LiBr (micro)", and "$Li_2S$ (micro)" are the cases where their peak intensities are less than 3% of the peak intensity of $Li_{7-x}PS_{6-x}Ha_x$.

As listed in Table 1, it could be confirmed that for the samples of Examples 1 to 16, the main production phases were $Li_{7-x}PS_{6-x}Ha_x$ having a cubic crystal structure belonging to a space group F-43m, and there were no un-reacted $Li_2S$, LiCl, and LiBr, or there were a little of them.

In addition, the values of the lightness L* were 60.0 or more, and also, the transport number of lithium ions were 90% or more. For all the samples, the ionic conductivities were 10⁻⁴ S/cm or more, that were very high values.

Meanwhile, for the samples of Comparative Examples 1 and 2 listed in Table 1, the main production phases were $Li_{7-x}PS_{6-x}Ha_x$ having a cubic crystal structure belonging to a space group F-43m, but the values of lightness L* were less than 60.0, and also, the transport number of lithium ions were less than 90%. The ionic conductivities were 10⁻⁴ S/cm or more that were very high values. It was considered that it caused because of high electron conductivity.

The samples of Comparative Examples 3 and 8 were not added in Ha, but even if being added therein, the amounts were very small. Therefore, the production phases were the orthorhombic crystal structure belonging to a space group $Pna2_1$, and having low ionic conductivity.

However, it was confirmed that like Example 16, even if having the same Cl amount as Comparative Example 8, it became $Li_{7-x}PS_{6-x}Ha_x$ having a cubic crystal structure belonging to a space group F-43m, by sufficiently performing the pulverizing and mixing.

The sample of Comparative Example 4 included Br, but the added amount thereof was too much. Therefore, the main production phase was $Li_{7-x}PS_{6-x}Ha_x$ having a cubic crystal structure belonging to a space group F-43m, but, other than, there were many LiBr that was a raw material that was not incorporated as a main phase. The LiBr hindered the lithium ionic conductivity, and thus, the ionic conductivity was very low, and thereby, was not measured.

The sample of Comparative Example 5 included Cl, but the added amount thereof was too many. Therefore, the main production phase was LiCl, $Li_2S$, and $Li_3PS_4$ that were raw materials. They hindered the lithium ionic conductivity, and thus, the ionic conductivity was too low and thus was not measured.

Since the samples of Comparative Examples 6 and 7 had higher firing temperature, the samples were melted and thus firmly adhered to a firing container. Therefore, it was difficult to evaluate them.

Since the samples of Comparative Examples 9 and 10 were fired with the Ar gas that was an inert atmosphere, but the firing temperature thereof was too high, the main production phases were $Li_{7-x}PS_{6-x}Ha_x$ having a cubic crystal structure belonging to a space group F-43m, but the values of lightness L* were less than 60.0 and also the transport number of lithium ions were less than 90%.

<Preparation and Evaluation of all-Solid Lithium Battery (Part 1)>

The positive electrode mixtures were prepared using the samples obtained in Examples 5 and 13 and Comparative Example 1 as a solid electrolyte to prepare all-solid lithium batteries (all-solid InLi/NCM cells), and then, the battery characteristics of the batteries (evaluations of charge/discharge efficiencies and cycle characteristics) were evaluated.

(Materials)

The powder prepared by coating a $ZrO_2$ film to $LiNi_{0.5}Co_{0.2}Mn_{0.3}O_2$ (NCM) that was a ternary layered compound was used as a positive electrode active material, an indium-lithium (InLi) foil was used as a negative electrode active material, and the samples (compounds) obtained in Examples and Comparative Examples were used as a solid electrolyte powder.

The positive electrode mixture powder was prepared by mixing a positive electrode active material powder, a solid electrolyte powder, and a conduction supporting agent (acetylene black) powder in the ratio of 40:54:6 using a ball mill.

(Preparation of all-Solid InLi/NCM Cell)

The samples (solid electrolyte powders) obtained in Examples and Comparative Examples were filled in an insulating tube of a sealed cell, 25 mg of the positive electrode mixture powder was filled in one side of a solid electrolyte pellet of about φ 13 mm×0.5 mmt prepared by uniaxially molding at 120 MPa, and then, the pellet thus obtained was uniaxially molded along with the solid electrolyte pellet at 240 MPa to form a positive electrode layer. The Indium-lithium alloy foil of φ 12 mm×1 mmt was put on the opposite side of the positive electrode layer, and then, fasten at the torque of 2 N·m with a pressuring screw to prepare an all-solid InLi/NCM cell.

(Measurement of Battery Characteristic)

The measurement of battery characteristics were evaluated after putting an all-solid battery cell in an environmental testing machine that was maintained at 25° C., and then, contacting with a charge/discharge measuring device. At this time, the charging was performed in a CC-CV way at the upper limit voltage of 3.7 V and the discharging was performed in a CC way at the lower limit voltage of 2.0 V. The charging and discharging were repeated at the current density of 0.066 (0.05 C) mA/cm for the first cycle to the fifth cycle, and the charging and discharging were performed at 0.133 (0.1 C) mA/cm for the sixth cycle. Since then, the charging and discharging were repeated at the current density of 0.066 (0.05 C) mA/cm for the seventh cycle to the tenth cycle to evaluate the cycle life characteristics.

The results are listed in Table 2.

and thus, they exhibited high performance as battery characteristics.

Meanwhile, for the all-solid battery of InLi/NCM cell prepared by using the sample of Comparative Example 1, as compared with the all-solid batteries prepared by using the samples of Examples 5 and 13, the charge voltage for the first cycle was low, and thus, exhibited high charge capacity until the upper limit voltage of 3.7 V. As the reason, it was considered that since the electron conductivity of the sample of Comparative Example 1 was high, there was generated a slight leak current in the solid electrolyte layer, aside from the electrochemical reaction involved with the desorption of lithium from the positive electrode active material and the occlusion of lithium into the negative electrode at the time of charging, and thus, in addition to the quantity of electricity contributing the desorption and occlusion of lithium, there was required extra quantity of electricity, thereby exhibiting a high charging capacity. Meanwhile, for the discharging, in addition to the decrease in discharging capacity involved with the irreversible reaction that was exhibited at the time of discharging, there was generated a slight leak current caused by the electron conductivity of solid electrolyte, and thus, the quantity of electricity that was required for discharging with the regular current density was unnecessarily required for the level corresponding to the leak current. For this reason, it was considered that there was generated a drop of electric pressure, and thus, the lower limit voltage was quickly reached, and as a result, only low discharging capacity was obtained. In addition, it was considered that even for the charging and discharging since then, it was difficult to obtain the charging and discharging capacities because of the affect of leak current and irreversible side reaction, thereby lowering the capacity retention rate that was a cycle characteristic.

<Preparation and Evaluation of all-Solid Lithium Battery (Part 2)>

The positive electrode mixture and negative electrode mixture were prepared by using the sample obtained in

TABLE 2

| Solid electrolyte | | | | Charge/discharge efficiency [%] | | Capacity retention rate [%] Based on second cycle | |
|---|---|---|---|---|---|---|---|
| Examples and Comparative Examples | Compositional Formulas | Positive electrode active material | Negative electrode active material | First cycle | Third cycle | Third cycle | Tenth cycle |
| Example 5 | $Li_6PS_5Cl$ | $NCM(ZrO_2$ coating) | InLi | 77.1 | 98.8 | 99.5 | 97.5 |
| Example 13 | $Li_{6.2}PS_{5.2}Cl_{0.8}$ | $NCM(ZrO_2$ coating) | InLi | 83.0 | 98.3 | 99.9 | 97.3 |
| Comparative Example 1 | $Li_6PS_5Cl$ | $NCM(ZrO_2$ coating) | InLi | 40.0 | 57.1 | 94.4 | 55.9 |

It was confirmed that when using a positive electrode active material having a layered structure such as NCM, it had irreversible capacity, and thus, the charge/discharge efficiency for the first cycle became low. However, there was the result in that for the all-solid batteries of InLi/NCM cells using the samples of Examples 5 and 13, the irreversible capacity for the first cycle could be reduced, and thus, the charge/discharge efficiency was high, and also, the capacity retention rate that was another cycle characteristic for the third cycle was high. It was considered that they had low electron conductivities and also high ionic conductivities, Example 5 as a solid electrolyte to prepare an all-solid lithium battery (all-solid Gr/NCM cell), and then, the battery characteristics (evaluations of charge/discharge efficiency and cycle characteristics) were evaluated.

(Materials)

The powder prepared by coating a $ZrO_2$ film to $LiNi_{0.5}Co_{0.2}Mn_{0.3}O_2$ (NCM) that was a ternary layered compound was used as a positive electrode active material, a graphite (Gr) powder was used as a negative electrode active material, and the samples (compounds) obtained in Examples and Comparative Examples were used as a solid electrolyte powder.

The positive electrode mixture powder was prepared by mixing a positive electrode active material powder, a solid electrolyte powder, and a conduction supporting agent (acetylene black) powder in the ratio of 40:54:6 using a ball mill.

Meanwhile, the negative electrode (Gr) mixture powder was prepared by mixing a Gr powder and a solid electrolyte powder in the ratio of 40:60 using a ball mill.

(Preparation of all-Solid Gr/NCM Cell)

The sample (solid electrolyte powder) obtained in Example 5 was filled in an insulating tube of a sealed cell, 25 mg of the positive electrode mixture powder was filled in one side of a solid electrolyte pellet of about φ 13 mm×0.5 mmt prepared by uniaxially molding at 120 MPa, and then, the pellet thus obtained was uniaxially molded along with the solid electrolyte pellet at 240 MPa to form a positive electrode layer. 13 mg of the negative electrode mixture powder was filled in the opposite side of the positive electrode layer; then, the solid electrolyte pellet and the positive electrode layer that was formed since then were again uniaxially molded at 240 MPa to form a negative electrode layer; and then, they were fasten at the torque of 3.5 N·m with a pressuring screw to prepare an all-solid Gr/NCM cell.

(Measurement of Battery Characteristic)

The measurement of battery characteristics were evaluated after putting an all-solid battery cell in an environmental testing machine that was maintained at 25° C., and then, contacting with a charge/discharge measuring device. At this time, the charging was performed in a CC-CV way at the upper limit voltage of 4.2 V and the discharging was performed in a CC way at the lower limit voltage of 2.5 V to evaluate the cycle life characteristics for the first cycle to the $50^{th}$ cycle.

In addition, for the evaluation, the charging and discharging were repeated at the current density of 0.133 (0.1 C) mA/cm for the sixth cycle, the $16^{th}$ cycle, and the $26^{th}$ cycle, and the charging and discharging were performed at 0.066 (0.05 C) mA/cm for other cycles. The results are listed in Table 3.

active material, it was possible to greatly improve the energy density of all-solid lithium secondary battery.

The invention claimed is:

1. A sulfide-based solid electrolyte for a lithium ion battery comprising a compound which has a cubic crystal structure belonging to a space group F-43m and is represented by Compositional Formula: $Li_{7-x}PS_{6-x}Ha_x$ (Ha is Cl or Br), wherein x in the above Compositional Formula represents 0.2 to 1.8, and a value of lightness L* in a L*a*b* color system is 60.0 or more.

2. The sulfide-based solid electrolyte for a lithium ion battery according to claim 1, wherein a transport number of lithium ion is 90% or more.

3. The sulfide-based solid electrolyte for a lithium ion battery according to claim 1, wherein when Ha is Cl in the above Compositional Formula, x represents 0.2 to 1.8.

4. The sulfide-based solid electrolyte for a lithium ion battery according to claim 1, wherein when Ha is Br in the above Compositional Formula, x represents 0.2 to 1.2.

5. The sulfide-based solid electrolyte for a lithium ion battery according to claim 1, wherein the sulfide-based solid electrolyte for a lithium ion battery can be obtained by mixing a lithium sulfide ($Li_2S$) powder, a phosphorus sulfide ($P_2S_5$) powder, and a lithium chloride (LiCl) powder or a lithium bromide (LiBr) powder, and firing the mixture thus obtained at 350 to 500° C. under an inert atmosphere or firing the mixture thus obtained at 350 to 650° C. under an atmosphere including a hydrogen sulfide gas.

6. A lithium ion battery comprising the solid electrolyte according to claim 1.

7. A lithium ion battery comprising the solid electrolyte according to claim 1 and a negative electrode active material including a carbon.

8. The sulfide-based solid electrolyte for a lithium ion battery according to claim 2, wherein when Ha is Cl in the above Compositional Formula, x represents 0.2 to 1.8.

9. The sulfide-based solid electrolyte for a lithium ion battery according to claim 2, wherein when Ha is Br in the above Compositional Formula, x represents 0.2 to 1.2.

TABLE 3

| Solid electrolyte | | Positive electrode active material | Negative electrode active material | Capacity retention rate (%) Based on second cycle | | | | | | | |
|---|---|---|---|---|---|---|---|---|---|---|---|
| Example | Compositional Formula | | | Third cycle (0.05 C) | Sixth cycle (0.10 C) | Tenth cycle (0.05 C) | $16^{th}$ cycle (0.05 C) | $20^{th}$ cycle (0.05 C) | $26^{th}$ cycle (0.10 C) | $30^{th}$ cycle (0.05 C) | $50^{th}$ cycle (0.05 C) |
| Example 5 | $Li_6PS_5Cl$ | NCM($ZrO_2$ coating) | Graphite | 100.1 | 95.1 | 95.3 | 88.7 | 87.6 | 82.7 | 82.1 | 75.0 |

There was obtained the result in that for the all-solid battery of the Gr/NCM cell using the sample of Example 5, like the all-solid battery of the InLi/NCM cell, the irreversible capacity for the first cycle could be reduced, thereby exhibiting high charge/discharge efficiency, and also, high capacity retention rate that was another cycle characteristic for the third cycle. In addition, it was confirmed that even if repeating the charging and discharging for the 50 cycles, about 75% of the capacity retention rate could be obtained, thereby exhibiting good cycle characteristics. In addition, even if the current density was increased from 0.05 C to 0.10 C, it was possible to suppress the decrease in capacity retention rate. Therefore, since the present solid electrolyte could use a carbon-based material as a negative electrode 10. The sulfide-based solid electrolyte for a lithium ion battery according to claim 2, wherein the sulfide-based solid electrolyte for a lithium ion battery can be obtained by mixing a lithium sulfide ($Li_2S$) powder, a phosphorus sulfide ($P_2S_5$) powder, and a lithium chloride (LiCl) powder or a lithium bromide (LiBr) powder, and firing the mixture thus obtained at 350 to 500° C. under an inert atmosphere or firing the mixture thus obtained at 350 to 650° C. under an atmosphere including a hydrogen sulfide gas.

11. The sulfide-based solid electrolyte for a lithium ion battery according to claim 3, wherein the sulfide-based solid electrolyte for a lithium ion battery can be obtained by mixing a lithium sulfide ($Li_2S$) powder, a phosphorus sulfide ($P_2S_5$) powder, and a lithium chloride (LiCl) powder or a lithium bromide (LiBr) powder, and firing the mixture thus obtained at 350 to 500° C. under an inert atmosphere or firing the mixture thus obtained at 350 to 650° C. under an atmosphere including a hydrogen sulfide gas.

12. The sulfide-based solid electrolyte for a lithium ion battery according to claim 4, wherein the sulfide-based solid electrolyte for a lithium ion battery can be obtained by mixing a lithium sulfide ($Li_2S$) powder, a phosphorus sulfide ($P_2S_5$) powder, and a lithium chloride (LiCl) powder or a lithium bromide (LiBr) powder, and firing the mixture thus obtained at 350 to 500° C. under an inert atmosphere or firing the mixture thus obtained at 350 to 650° C. under an atmosphere including a hydrogen sulfide gas.

13. A lithium ion battery comprising the solid electrolyte according to claim 2.

14. A lithium ion battery comprising the solid electrolyte according to claim 3.

15. A lithium ion battery comprising the solid electrolyte according to claim 4.

16. A lithium ion battery comprising the solid electrolyte according to claim 5.

17. A lithium ion battery comprising the solid electrolyte according to claim 2 and a negative electrode active material including a carbon.

18. A lithium ion battery comprising the solid electrolyte according to claim 3 and a negative electrode active material including a carbon.

19. A lithium ion battery comprising the solid electrolyte according to claim 4 and a negative electrode active material including a carbon.

20. A lithium ion battery comprising the solid electrolyte according to claim 5 and a negative electrode active material including a carbon.

* * * * *